(12) United States Patent
Rockenfeller et al.

(10) Patent No.: US 9,071,078 B2
(45) Date of Patent: Jun. 30, 2015

(54) ENCLOSURE HOUSING ELECTRONIC COMPONENTS HAVING HYBRID HVAC/R SYSTEM WITH POWER BACK-UP

(75) Inventors: Uwe Rockenfeller, Boulder City, NV (US); Paul Sarkisian, Boulder City, NV (US); Kaveh Khalili, Boulder City, NV (US); Warren Harhay, Boulder City, NV (US)

(73) Assignee: ROCKY RESEARCH, Boulder City, NV (US)

( * ) Notice: Subject to any disclaimer, the term of this patent is extended or adjusted under 35 U.S.C. 154(b) by 1135 days.

(21) Appl. No.: 13/012,072

(22) Filed: Jan. 24, 2011

(65) Prior Publication Data

US 2012/0187764 A1    Jul. 26, 2012

(51) Int. Cl.
| | |
|---|---|
| H02J 1/00 | (2006.01) |
| H02J 9/06 | (2006.01) |
| F25B 27/00 | (2006.01) |
| F24F 5/00 | (2006.01) |
| F25B 29/00 | (2006.01) |

(52) U.S. Cl.
CPC . H02J 9/062 (2013.01); F24F 5/00 (2013.01); F25B 27/00 (2013.01); F25B 29/00 (2013.01)

(58) Field of Classification Search
CPC ............. F24F 5/00; F25B 29/00; F25B 27/00
USPC ......................................................... 307/66
See application file for complete search history.

(56) References Cited

U.S. PATENT DOCUMENTS

| | | | |
|---|---|---|---|
| 3,424,916 A | 1/1969 | Fenley | |
| 4,006,603 A | 2/1977 | Miles | |
| 4,340,823 A | 7/1982 | Miyazawa | |
| 4,665,707 A | 5/1987 | Hamilton | |
| 4,694,236 A | 9/1987 | Upadhyay et al. | |
| 5,675,982 A | 10/1997 | Kirol et al. | |
| 5,718,125 A | 2/1998 | Pfister et al. | |
| 5,874,788 A | 2/1999 | McCartney | |

(Continued)

FOREIGN PATENT DOCUMENTS

| | | |
|---|---|---|
| EP | 0901218 A2 | 3/1999 |
| EP | 1057236 B1 | 4/2004 |

(Continued)

OTHER PUBLICATIONS

Buchholz, Energy efficiency improvements in commercial cooling applications, Sanken Technical Report, 2002, vol. 34, Issue 1, pp. 47-50.

(Continued)

*Primary Examiner* — Daniel Cavallari
(74) *Attorney, Agent, or Firm* — Knobbe Martens Olson & Bear LLP (57) ABSTRACT

An enclosure or shelter having an interior chamber for housing electronic components and equipment is provided with an HVAC/R system configured with a rechargeable DC power source for power back-up to maintain substantially uninterrupted power in the case of a main power failure. The system includes one or more variable frequency drives (VFD) controlled by a VFD controller and configured to provide three-phase power to one or more three-phase AC motors and single-phase power to one or more single-phase AC motors. The system also includes a power source controller configured to select and power sources based on availability of one or more power sources and other logic.

29 Claims, 7 Drawing Sheets

(56) References Cited

U.S. PATENT DOCUMENTS

| | | | |
|---|---|---|---|
| 5,927,598 | A | 7/1999 | Broe |
| 5,929,538 | A | 7/1999 | O'Sullivan et al. |
| 5,977,659 | A | 11/1999 | Takehara et al. |
| 6,005,362 | A * | 12/1999 | Enjeti et al. ............... 318/479 |
| 6,094,034 | A | 7/2000 | Matsuura |
| 6,242,883 | B1 | 6/2001 | Strunk |
| 6,257,007 | B1 | 7/2001 | Hartman |
| 6,304,006 | B1 | 10/2001 | Jungreis |
| 6,316,895 | B1 | 11/2001 | Ramarathnam |
| 6,471,013 | B2 | 10/2002 | Banno et al. |
| 6,639,373 | B2 | 10/2003 | Knight et al. |
| 6,843,064 | B2 | 1/2005 | Khalili et al. |
| 6,847,130 | B1 | 1/2005 | Belehradek et al. |
| 7,151,328 | B2 | 12/2006 | Bolz et al. |
| 7,332,885 | B2 | 2/2008 | Schnetzka et al. |
| 7,418,825 | B1 * | 9/2008 | Bean, Jr. ............... 62/259.2 |
| 7,630,856 | B2 * | 12/2009 | Rockenfeller et al. ....... 702/132 |
| 2003/0048006 | A1 | 3/2003 | Shelter, Jr. et al. |
| 2004/0046458 | A1 | 3/2004 | MacKay |
| 2004/0095091 | A1 | 5/2004 | McNulty et al. |
| 2004/0245949 | A1 | 12/2004 | Ueda et al. |
| 2005/0006958 | A1 | 1/2005 | Dubovsky |
| 2006/0103342 | A1 | 5/2006 | Mechi |
| 2006/0208685 | A1 * | 9/2006 | Schnetzka ............... 318/800 |
| 2006/0208687 | A1 | 9/2006 | Takeoka et al. |
| 2007/0005195 | A1 * | 1/2007 | Pasquale et al. ............. 700/295 |
| 2007/0052241 | A1 * | 3/2007 | Pacy ............................ 290/1 R |
| 2007/0114962 | A1 | 5/2007 | Grbovic |
| 2010/0094490 | A1 * | 4/2010 | Alston et al. .................. 701/21 |
| 2013/0063994 | A1 * | 3/2013 | Alexander .................. 363/123 |
| 2013/0263613 | A1 * | 10/2013 | Bittner et al. ................. 62/56 |
| 2013/0271083 | A1 * | 10/2013 | Williams .................... 320/128 |

FOREIGN PATENT DOCUMENTS

| | | |
|---|---|---|
| GB | 1287648 | 9/1972 |
| GB | 2354378 A | 3/2001 |
| JP | 4-364372 | 12/1992 |
| JP | 5-157330 | 6/1993 |
| JP | 5-276690 | 10/1993 |
| JP | 5-324106 | 12/1993 |
| JP | 7-239672 | 9/1995 |
| JP | 9-168299 | 6/1997 |
| JP | 2005-210869 | 8/2005 |
| JP | 2008-048568 | 2/2008 |
| WO | WO 98/02695 A2 | 1/1998 |
| WO | WO 2005/020407 A2 | 3/2005 |

OTHER PUBLICATIONS

Holtz et al., A high-power multitransistor-inverter uninterruptable power supply system, IEEE Transactions on Power Electronics, Jul. 1988, vol. 3, Issue 3, pp. 278-285.

Mallinson, "Plug and play" single chip controllers for variable speed induction motor drives in white goods and HVAC systems, Thirteenth Annual Applied Power Electronics Conference and Exposition, Feb. 19, 1998, vol. 2, pp. 756-762.

Manz, Applying adjustable speed drives (ASDs) to 3 phase induction NEMA frame motors, Proceedings of 38th Cement Industry Technical Conference, Apr. 14, 1996, pp. 71-78.

Matsui et al., Improvement of transient response of thermal power plant using VVVF inverter, International Conference on Power Electronics and Drive Systems, Nov. 27, 2007, pp. 1209-1214.

Meenakshi et al., Intelligent controller for a stand-alone hybrid generation system, 2006 IEEE Power India Conference, Apr. 10, 2006, pp. 8.

Muntean et al., Variable speed drive structures and benefits in cooling tower fans applications, Dept. of Electr. Eng., Univ. Politehnica of Timisoara, Romania WSEAS Transactions on Systems, Apr. 2007, vol. 6, Issue 4, pp. 766-771.

Nelson et al., Basics and advances in battery systems, IEEE Transactions on Industry Applications, Mar. 1995, vol. 31, Issue 2, pp. 419-428.

Prest et al., Development of a three-phase variable speed drive system for a battery fed underground mining locomotive, Third International Conference on Power Electronics and Variable-Speed Drives, Jul. 13, 1988, pp. 233-236.

Stefanovic, Adjustable speed drives: Applications and R&D needs; Department of Energy, Washington, DC. Report No. ORNL/SUB-80-SN772, Sep. 1995.

Sukumara et al., Fuel cell based uninterrupted power sources, International Conference on Power Electronics and Drive Systems, May 26, 1997, vol. 2, pp. 728-733.

Suryawanshi et al., High power factor operation of a three-phase rectifier for an adjustable-speed drive, IEEE Transactions on Industrial Electronics, Apr. 2008, vol. 55, Issue 4, pp. 1637-1646.

Thoegersen et al., Adjustable Speed Drives in the Next Decade: Future Steps in Industry and Academia, Electric Power Components and Systems, 2004, vol. 32, Issue 1, pp. 13-31.

Tolbert et al., A bi-directional DC-DC converter with minimum energy storage elements, Conference Record of the Industry Applications Conference, 2002., Oct. 13, 2002, vol. 3, pp. 1572-1577.

Tracy et al., Achieving high efficiency in a double conversion transformerless UPS, IECON 2005, Nov. 6, 2005, pp. 4.

Welchko et al., A novel variable frequency three-phase induction motor drive system using only three controlled switches, Thirty-Fifth IAS Annual Meeting and World Conference on Industrial Applications of Electrical Energy, Oct. 8, 2000, vol. 3, pp. 1468-1473.

Yang et al., An improved assessment model of variable frequency-driven direct expansion air-conditioning system in commercial buildings for Taiwan green building rating system, Taiwan Building and environment, 2007, vol. 42, Issue 10, pp. 3582-3588.

Yuan et al., Integrated uninterruptible DC converter with low input distortion and wide regulation capability, Fifth International Conference on Power Electronics and Variable-Speed Drives, Oct. 26, 1994, pp. 638-644.

Zhan et al., Development of a single-phase high frequency UPS with backup PEM fuel cell and battery, International Conference on Electrical Machines and Systems, Oct. 8, 2007, pp. 1840-1844.

* cited by examiner

ENCLOSURE HOUSING ELECTRONIC COMPONENTS HAVING HYBRID HVAC/R SYSTEM WITH POWER BACK-UP

BACKGROUND OF THE INVENTION

Telecommunication shelters or enclosures are often located in remote areas. These shelters are typically cooled by on-site electrically powered air conditioning systems, which maintain the interior temperature below that which would cause the telecommunication system to shut down or otherwise fail or compromise reliable operations. Other shelters for electronic equipment such as military sites, outposts or FEMA equipment locations that house temperature sensitive electronic components for military, surveillance, detection or other applications may also be located such that access to convenient electrical power from a power grid is limited, or even unavailable.

In locations where grid power is unavailable or unreliable, AC power may be provided by generators. However, if AC power is lost, without adequate, immediate, power back-up, temperature-sensitive systems may shut down operations if the temperature inside the shelter rises above a certain threshold. This can lead to significant damage of sensitive computer equipment.

Although battery back-up systems are provided for many applications, such back-up is typically used only for operating the electronic or telecommunications equipment, and may be insufficient for providing power to air conditioning systems because of limited battery power output.

SUMMARY OF THE INVENTION

An electronic equipment shelter or enclosure may include a heating, ventilation, air conditioning, and refrigeration (HVAC/R) system having a power back-up and be configured to maintain the environment within the enclosure or shelter. The power back-up can provide sufficient power for continued operation of HVAC/R system when the primary power source is unavailable.

In one embodiment, an enclosure comprising temperature sensitive electronic components and a HVAC/R system for controlling the temperature within said enclosure includes an alternating current (AC) power source; an HVAC/R system comprising one or more three-phase motors and one or more single-phase motors; a direct current (DC) power source comprising a rechargeable battery assembly configured to provide power to the HVAC/R system when sufficient alternating current is not available from the AC power source; and a variable frequency drive (VFD) configured to provide three-phase power to the one or more three-phase motors and single-phase power to the one or more single-phase motors.

In another embodiment, an enclosure for housing electronic components and an air conditioning system, includes: an air conditioning system comprising a condenser, a variable speed condenser motor and one or more evaporators; an AC power source; a DC power source comprising a rechargeable battery assembly configured to provide power to the air conditioning system when sufficient alternating current is not available from the AC power source; a VFD configured to provide three-phase power to the variable speed condenser motor; and a pulsed operation refrigerant flow control valve configured to control refrigerant flow to the one or more evaporators.

In yet another embodiment, an HVAC/R system includes: one or more three-phase motors; one or more single-phase motors; an AC power generator; a DC power source comprising a rechargeable battery assembly configured to provide power to the HVAC/R system when sufficient alternating current is not available; and a VFD power supply electrically connected to the DC power source and configured to provide three-phase power to the three-phase motor and single-phase power to single-phase motor.

In a further embodiment, an HVAC/R power supply system includes: an AC power source connected to a rectifier to provide DC power to a DC power bus; a DC power source connected to the DC power bus; a VFD configured to receive DC power and output AC power to at least one AC motor in an HVAC/R system; and a VFD controller electrically connected to the VFD and configured to control the output frequency of the VFD in order to control the speed of the AC motor.

In an additional embodiment, a method for controlling an HVAC/R power supply system, includes: receiving data indicating a capacity of an AC power source; receiving data indicating a capacity of a DC power source; receiving data indicating an electric load of an HVAC/R system; instructing a VFD controller to draw power from the DC power source if the AC power source capacity is less than the electric load of the HVAC/R system; and instructing the VFD controller to reduce the load of the HVAC/R system if the load is greater than the combined AC power source capacity and DC power source capacity.

DETAILED DESCRIPTION

One embodiment relates to an enclosure that houses sensitive electronic equipment, such as telecommunications equipment. The enclosure uses a heating, ventilation, air conditioning, and refrigeration (HVAC/R) system for controlling the temperature within the enclosure so that the electronic equipment does not become damaged by exposure to high temperatures. In this embodiment, the HVAC/R system is powered by alternating current (AC) under normal conditions, but also is connected to a direct current (DC) power source that may provide power when sufficient AC power is unavailable. The HVAC/R system is run using one or more three-phase motors and one or more single phase motors in order to be most efficient at providing cooling for the enclosure. In order to maintain efficiency, a variable frequency drive (VFD) which provides three phase power to the three phase motors and single phase power to the single phase motors may be used within the HVAC/R system. In one embodiment, the AC power is first converted to DC power in order to power the VFD.

Three-phase motors, such as compressor motors within an HVAC/R system, may be operated much more efficiently and with less wear if the character of the power running them is controllable. For example, in one embodiment, when starting a three-phase electric motor, the frequency of the driving power can be modulated to avoid transient current spikes and unnecessary wear on the motor. Variable Frequency Drives (VFDs) are able to receive DC power and output modulated (i.e. frequency controlled) AC power to electric motors. By varying the frequency of the power to an electric motor, a VFD can more efficiently control the speed of that electric motor. The system described herein can utilize VFDs in an HVAC/R system to increase the efficiency of the system by providing control of the speed and output of the HVAC/R system components. For example, if a temperature controlled environment needs slight cooling, it is more efficient to run the HVAC/R system components, such as the compressor motor, at a reduced speed to meet the actual need, rather than to run it at full speed. Being able to modulate the speed of HVAC/R components such as those mentioned above also prevents unnecessary cycling of the system and allows for more fine control of the environment as a whole.

Because of the variety of different HVAC/R system components and their individual power requirements, it is often advantageous to provide more than one VFD in an HVAC/R system. Further, a VFD controller may be provided to provide overall control of the multiple VFDs to maximize HVAC/R system performance and efficiency.

Traditional AC power sources, such as AC grid power, can be unreliable depending on the location of the power supply need, the weather, and other variables. Thus, one embodiment is a shelter that uses an HVAC/R power supply system that can provide uninterrupted power to the HVAC/R system components regardless of the status of the AC power source. Thus, embodiments include a DC power source, such as a battery, which stores electrical power and may be utilized to control a VFD when AC power from the AC power source is not available. In another embodiment, the DC power source may be used to supplement the power available to the HVAC/R system when, for example, the AC power source comes from a generator with limited output capacity. In such a system, the DC power source may be utilized to provide supplemental power during periods of increased electrical load, or to provide power during periods where the AC power generator is not available.

Another embodiment relates to a system that uses a power source controller that allows an HVAC/R system to selectively draw power from one of a plurality of individual power sources. A power source controller, which may be standalone or built into a VFD controller, can increase the overall system efficiency by precisely controlling the source of the power for the HVAC/R components when multiple sources are available.

Accordingly, one embodiment relates to providing power to an HVAC/R system, which may include AC and DC power sources with different electrical characteristics, and which is configured to supply uninterrupted power to the HVAC/R system components under a wide variety of circumstances. In this embodiment the system is able to reliably and efficiently maintain the internal environment of various types of enclosures, which may house sensitive electronic equipment, thereby ensuring optimal operation of the electronic equipment.

Figure 1:
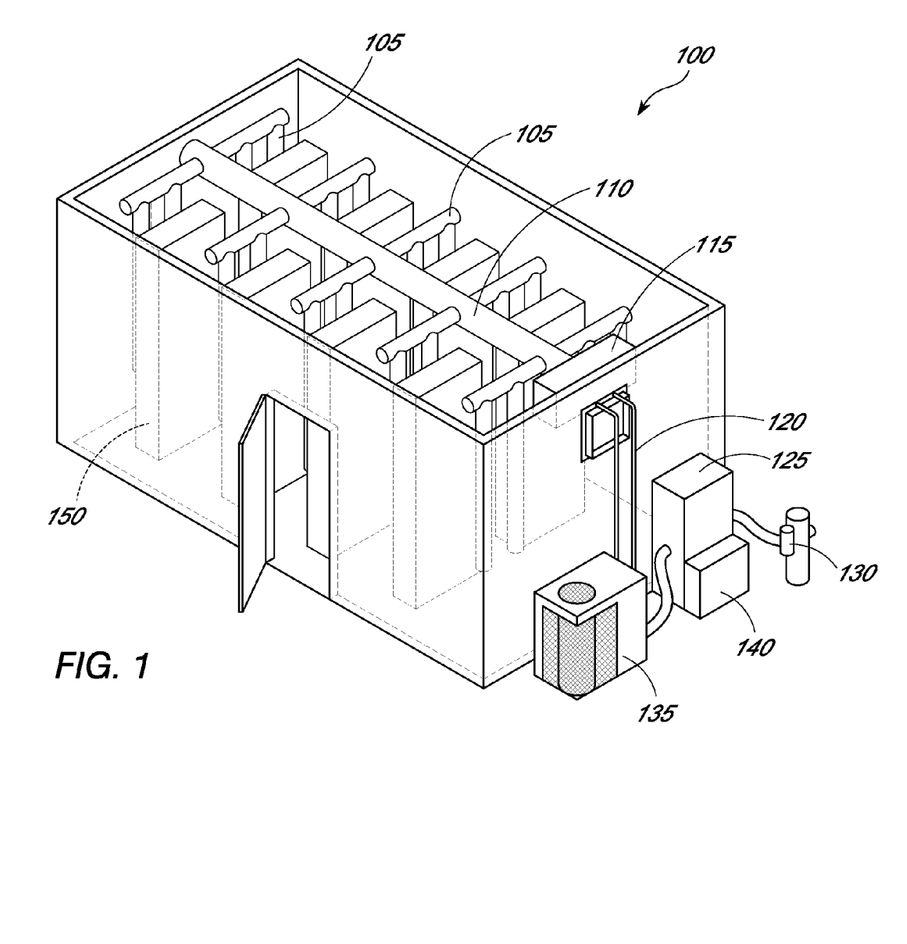
FIG. 1 is a perspective illustration of a telecommunication shelter with the roof and some sidewalls removed to show the interior chamber and generally show the air conditioning and handling system.

FIG. 1 is a perspective illustration of a telecommunication shelter 100 with the roof and some sidewalls removed to show the interior chamber and generally show the air conditioning and handling system. Within the telecommunications shelter 100 are vertical racks 150, which have shelves configured to support various types of electronic equipment, such as telecommunications equipment. The environment of the telecommunications shelter 100 is controlled by a heating, ventilation, air conditioning, and refrigeration (HVAC/R) system. The HVAC/R system may include components such as a condenser unit 135, refrigerant lines 120, air handling unit 115, primary air duct 110 and secondary air ducts 105. Additional HVAC/R components are discussed more completely with reference to FIG. 3. The components of the HAVC/R system work to control the environment within the shelter 100, including for example, the temperature and the humidity. Additional description of the air handling embodiment can be found in U.S. patent application Ser. No. 11/941, 839, filed Nov. 16, 2007, and incorporated herein by reference in its entirety. Additionally, the shelter is provided with a connection to an AC power source 130, such as a connection to common AC grid power.

To provide uninterrupted power to the HVAC/R system, power is supplied to the HVAC/R system by a power supply unit 125, which includes a Direct Current (DC) power source 140. The DC power source 140 may be, for example, one or more DC batteries. In other embodiments, the DC power source 140 is housed within power supply unit 125 enclosure. Preferably, the DC power source 140 is rechargeable. In the embodiment of FIG. 1, if the AC power source 130 becomes unavailable, the power supply unit 125 may instead provide power to the HVAC/R system from the stored capacity in the DC power source 140. Thus, the HVAC/R system is able to maintain the environment in the telecommunications shelter 100 regardless of the instant availability of the AC power source 130.

Figure 2:
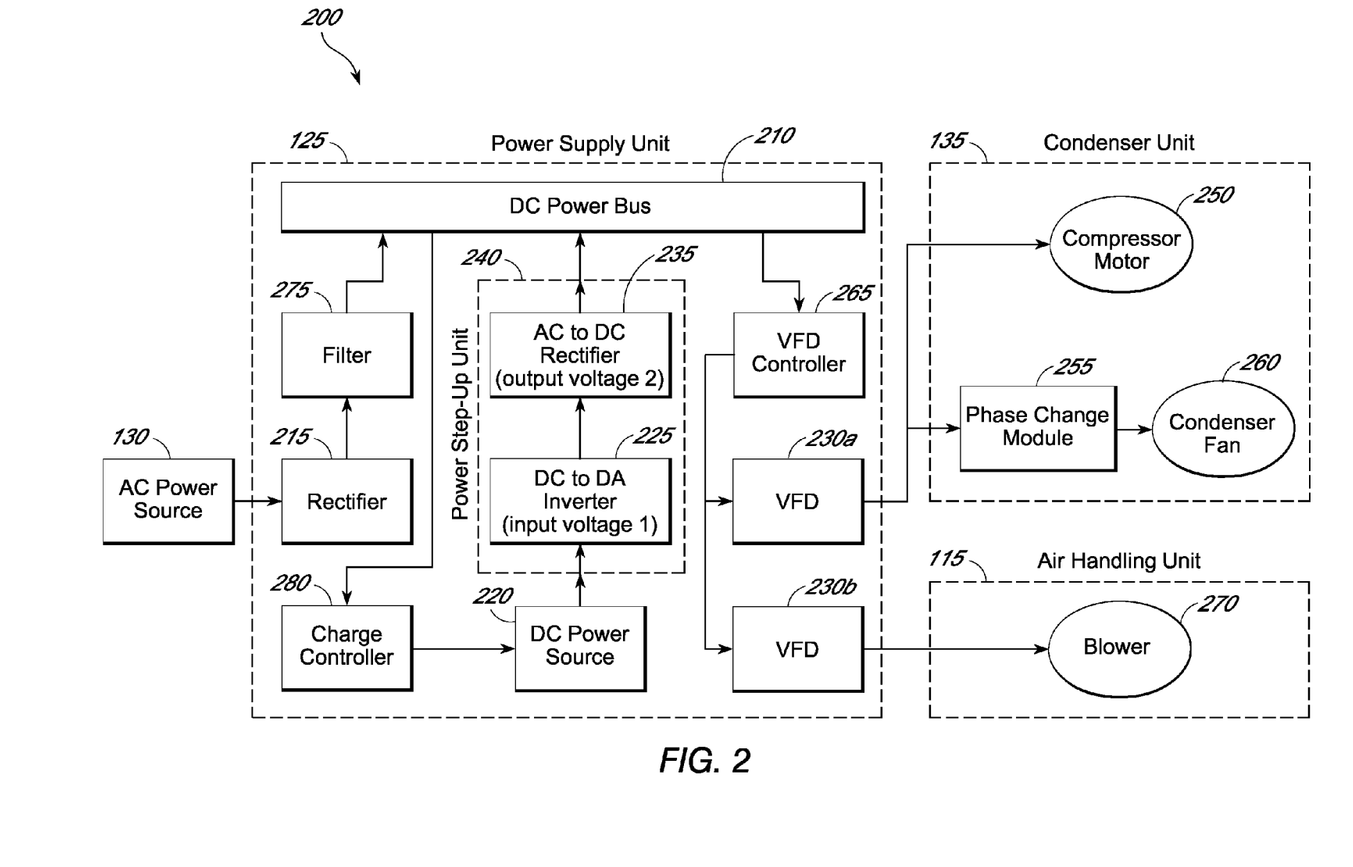
FIG. 2 is a schematic block diagram illustrating an embodiment of an HVAC/R power supply system with a rechargeable DC power back-up.

FIG. 2 is a schematic block diagram illustrating an embodiment of an HVAC/R power supply system 200 with a rechargeable DC power back-up, as well as components of an HVAC/R system. The AC power source 130 provides AC power from, for example, AC grid power. The AC power source 130 is electrically connected to a rectifier 215. A rectifier is an electrical device that converts AC power, which periodically reverses direction, to DC power, where the current flows in only one direction. Rectifiers may be made of solid state diodes, vacuum tube diodes, mercury arc valves, and other components as are well known in the art. In some embodiments, the rectifier 215 includes an integral transformer capable of varying the AC input voltage from, for example, AC power source 130. A rectifier embodiment with integral transformer is described in more detail with respect to FIG. 3, below. In a preferred embodiment, a filter 275 (or smoothing circuit) is electrically connected to the output of the rectifier in order to produce steady DC current from the rectified AC power source 130. Many methods exist for smoothing the DC current including, for example, electrically connecting a reservoir capacitor or smoothing capacitor to the DC output of the rectifier 215. The filter 275 is also electrically connected with the DC power bus 210 to provide filtered DC power to other HVAC/R power supply system 200 components.

The DC power bus 210 electrically connects to components of the HVAC/R power supply system 200 to provide electric power to those components. The DC power bus 210 may include one or more conductors, such as wires or cables, capable of conducting and transmitting electric power. The DC power bus 210 may be a multi-wire loom with physical connectors so that the bus may be connected to components and expanded to meet the power needs of the HVAC/R power supply system 200. Certain embodiments of a DC power bus may comprise sub-buses that are at different voltages, such as a high-voltage DC sub-bus and a low-voltage DC sub-bus. In this way, a single DC power bus can provide DC power at different voltage levels in accordance with the needs of the components connected to the DC power bus 210 as well as the voltages of the various power sources connected to the system. In this embodiment, the DC power bus 210 electrically connects to the DC power source 220 so that it may be recharged. The DC power source 220 may be, for example, a battery, or a plurality of batteries electrically connected to each other. If multiple batteries are used, they may be connected in series or in parallel to produce resultant voltages different from the voltage of the individual battery units. To limit the amount of charge current flowing to the DC power source 220, a current limiting circuit or battery charge controller 280 may be placed between the power bus 210 and the DC power source 220. The charge controller 280 limits the current charging the DC power source 220 according to the specification of the DC power source 220 so that it is not damaged while being charged. Additionally, the battery charge controller 280 may condition the DC power source 220 for longer lasting operation.

The DC power source 220 may include one or more batteries, such as automobile batteries. Typically, such batteries have relatively low voltages, such as 12 volt or 24 volt. While it may be possible to increase the voltage by wiring the batteries in series, it may be preferable to have fewer batteries or a lower voltage DC power source 220. Accordingly, the DC power source 220 may be connected to a power step-up unit 240. Stepping-up voltage may be accomplished by a DC to DC conversion utilizing a DC to AC inverter. A DC to AC inverter is an electrical device that converts DC power to AC power. The converted AC current can be at any voltage and frequency with the use of appropriate transformers, switching, and control circuits, as is well known in the art. Inverters are commonly used to supply AC power from DC sources such as solar panels or batteries. In FIG. 2, DC power source 220 is a low voltage power source, such as a 12 volt automobile battery. The DC power source 220 is electrically connected to power step-up unit 240, which includes DC to AC inverter 225. The inverter 225 converts the low voltage current from the DC power source 220 to a higher voltage output AC current. Power step-up unit 240 also includes a rectifier 235. The inverter 225 is electrically connected to rectifier 235, which converts the high voltage AC current back to a DC current, but at a higher voltage than the original DC power source 220 voltage. For example, 12 volt current from a DC power source 220 may be converted to a 300 volt DC current using the power step-up unit 240. An embodiment of a power step-up unit is described further with reference to FIG. 4, below. The power step-up unit 240 is also connected to the DC power bus 210 to supply high voltage DC power to HVAC/R system components. The same process can also be used to step-down the voltage of the DC power source 220, where, for example, the DC power source is a high voltage source and low voltage DC is needed. The process for stepping-down the voltage would be the same, except the step of inverting the DC current to AC would lower rather than raise the voltage of the supplied current.

AC power may also be selectively stepped-up or down by use of a transformer, which is a device that transfers electrical energy from one circuit to another through inductively coupled conductors. A varying current in the first or primary conductor creates a varying magnetic flux in the transformer's core and thus a varying magnetic field through the secondary conductor. This varying magnetic field induces a voltage in the secondary conductor. If a load is connected to the secondary conductor, an electric current will flow in the secondary conductor and electrical energy will be transferred from the primary circuit through the transformer to the load. By appropriate selection of the ratio of turns in each conductor, a transformer my selectively step-up or step-down AC voltage.

The DC power bus 210 also electrically connects to a Variable Frequency Drive (VFD) controller 265. The VFD controller 265 is electrically connected to the VFDs 230 and comprises electronics which provide power and control signals to the VFDs 230 to, for example, turn them on or off, or to modulate their drive frequencies during operation. The VFD controller 265 may receive signals from sensors (not shown), such as temperature sensors, mounted within the telecommunications shelter 100 and may include logic for the control of the VFDs 230. In other embodiments, the VFD controller 265 may comprise a fixed control panel (not shown) mounted in a remote location, such as in the telecommunications shelter 100, operable to control the VFDs manually. The VFD controller 265 may also monitor the current load on the power bus 210 and vary the current draw of the VFDs (230*a* and 230*b*) to avoid any dangerous over-current condition. In alternative embodiments, the VFD controller 265 may require AC power, and so it may be electrically connected to an inverter (not shown) fed by the DC power bus 210 so as to receive AC operating power. In yet another embodiment, a VFD may provide AC power to a controller that requires AC operating power. In a further embodiment, the VFD controller may receive AC power directly from the AC power source 130. The VFD controller 265 may comprise a microprocessor or computing system including software and hardware configured to accomplish the aforesaid operations.

Each VFD controls the rotational speed of an AC electric motor, such as compressor motor 250 and blower 270. The VFD controls the speed of the motor by controlling the frequency of the electrical power supplied to the motor, as is well known in the art. Variable-frequency drives are sometimes alternatively referred to as adjustable-frequency drives (AFD), variable-speed drives (VSD), AC drives, microdrives or inverter drives. Since the voltage is varied along with frequency, these are sometimes also called VVVF (variable voltage variable frequency) drives. In the embodiment shown in FIG. 2, there are multiple VFDs (230*a* and 230*b*) electrically connected to separate components of the HVAC/R system. Because different elements of the HVAC/R system, such as the compressor motor 250 and the blower 270 may have different operational requirements, such as optimal speed and current draw, it is convenient to provide multiple VFDs based on the system needs; however, multiple VFDs are not necessary. Further, VFDs are preferred because they can vary the speed of different motor elements according to HVAC/R system needs. For example, when the HVAC/R system is in a cooling mode wherein the cooling requirements are minimal, the VFDs can lower the speed of the blower 270 as well as reducing the speed of the compressor motor 250 to accommodate for the reduced cooling needs. This not only reduces overall power consumption advantageously, but it reduces unnecessary wear on HVAC/R system components. A VFD, such as VFD 230*a*, may also be electrically connected to a phase change module 255 which is then electrically connected to another HVAC/R element, such as condenser fan 260. In this embodiment, the condenser fan 260 has a single-phase motor which is not compatible with the multi-phase output of VFD 230a, which is necessary for the compressor motor 250 on the same circuit. However, because the compressor motor 250 and condenser fan 260 typically operate at the same time, it is convenient to have current provided to both by VFD 230a. The phase change module 255 adapts the multi-phase VFD output current to a single-phase current to operate the condenser fan 260 efficiently. In certain embodiments, the phase change module 255 may comprise a plurality of capacitors in series and at least one capacitor in parallel with the plurality of capacitors in series. In other embodiments, the VFDs are electrically connected to the DC power bus 210 and are controlled individually by, for example, local control panels, without the need for a VFD controller 265.

Figure 3:
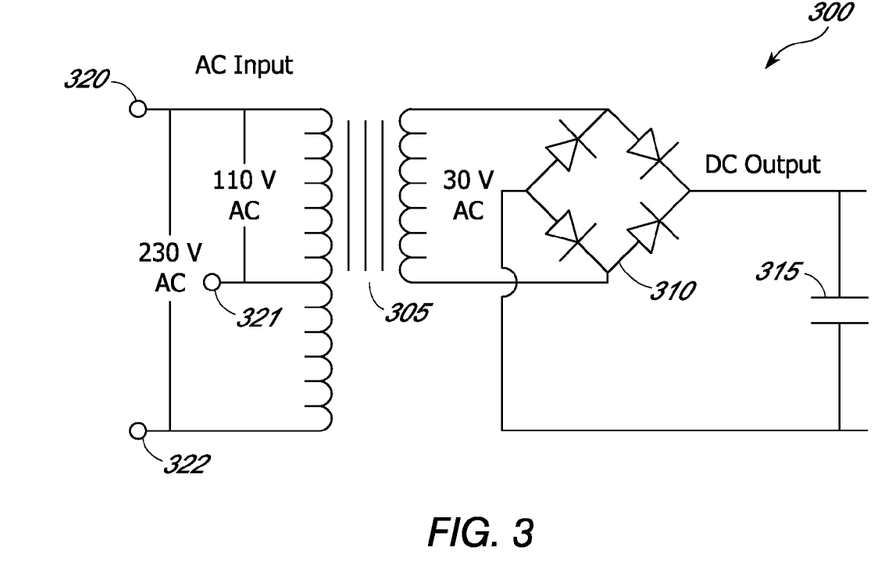
FIG. 3 is a schematic diagram illustrating an embodiment of an integrated rectifier.

FIG. 3 is a schematic diagram illustrating an embodiment of an integrated rectifier 300. The Rectifier 300 includes an integral transformer 305, rectifier circuit 310, and filter 315. In this embodiment, the rectifier 300 is capable of receiving both a 230 volt AC signal and a 110 volt AC signal, and is configured to produce a 30 volt DC output signal. A low voltage DC signal may be used for charging a DC power source (not shown). Accordingly, in some embodiments, a rectifier such as rectifier 300 can be directly, electrically connected to a DC power source, such as a battery, such that the low voltage DC output can charge the DC power source. The transformer 305 includes three taps 320-322 on the input side. To produce a 110 volt AC signal, the top two taps, 320 and 321, are electrically connected to the transformer 305. Alternatively, to produce a 230 volt AC signal, the two outermost taps, 320 and 322, are electrically connected to the transformer 305. The transformer 305 steps down the input voltage to produce a lowered output voltage for the rectifier circuit 310. In this embodiment, the rectifier circuit 310 is a four diode bridge rectifier. Other rectifier configurations may be used. The filter 315 then smoothes the DC output signal from the rectifier circuit 310. As shown in FIG. 3, the filter 315 is a single capacitor. In other embodiments, alternative filters may be used as are known in the art.

Figure 4:
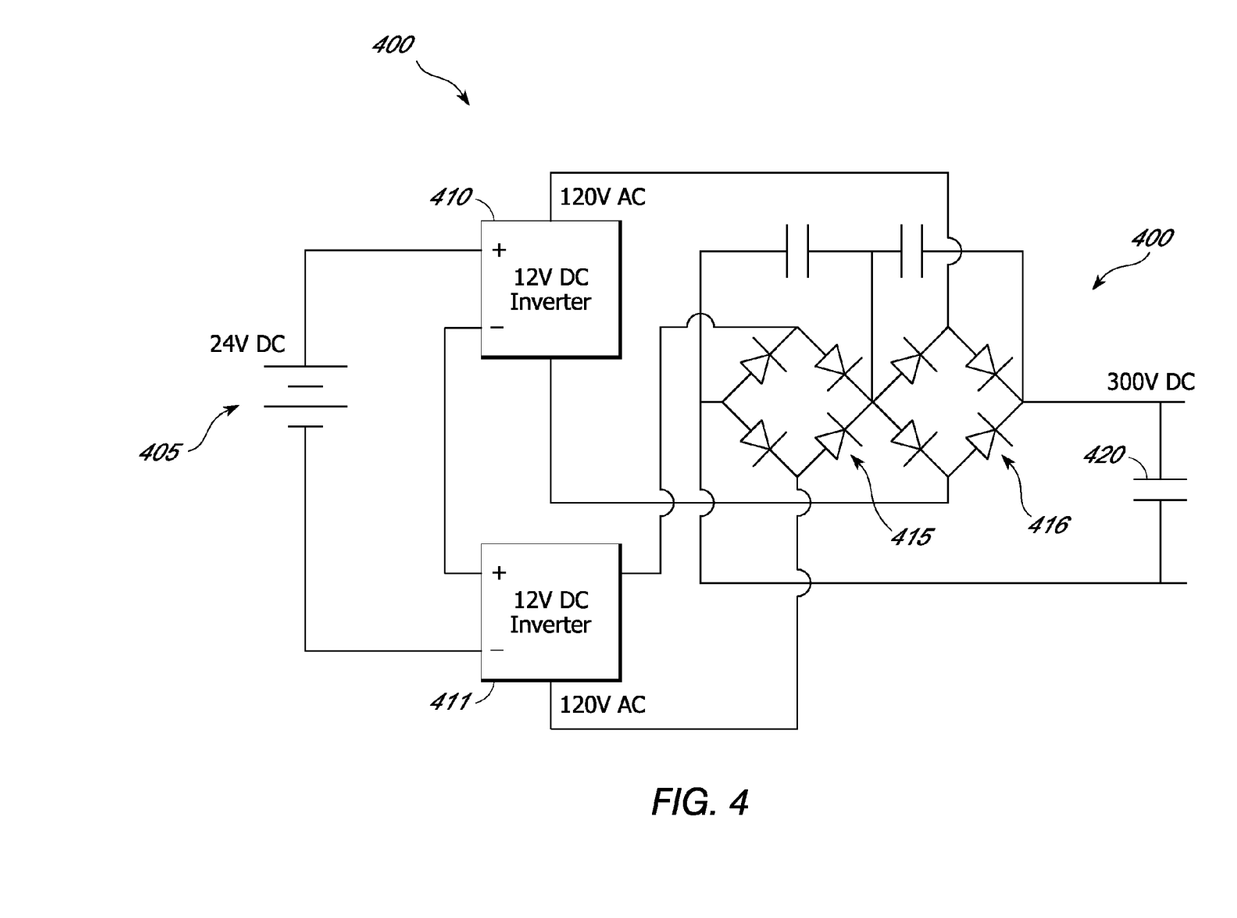
FIG. 4 is a schematic diagram illustrating an embodiment of a power step-up unit.

FIG. 4 is a schematic diagram illustrating an embodiment of a power step-up unit, such as power step-up unit 240 of FIG. 2. Power step-up unit 400 includes two 12 volt DC to 120 volt AC inverters, 410 and 411, rectifiers 415 and 416, and filter 420. Power step-up unit 400 receives a 24 volt DC power signal from a DC power source 405, such as a battery, or series of batteries, and outputs 300 volt DC power. The two inverters 410 and 411 are each configured to receive a 12 volt DC input and output a 120 volt AC signal. The rectifiers 415 and 416 rectify the respective AC signals producing DC outputs of about 150 volts each. The rectifiers 415 and 416 are connected in serial, and therefore collectively produce a combined DC signal of about 300 volts. In the embodiment shown in FIG. 4, the rectifiers 415 and 416 are each a four diode bridge rectifier in parallel with a capacitor. Other rectifier configurations may be used. Additionally, a filter 420 is connected across the rectifier outputs. The filter 420 is configured to improve the quality of the DC output signal. As shown in FIG. 4, the filter 420 is a single capacitor. In other embodiments, alternative filters may be used.

Figure 5:
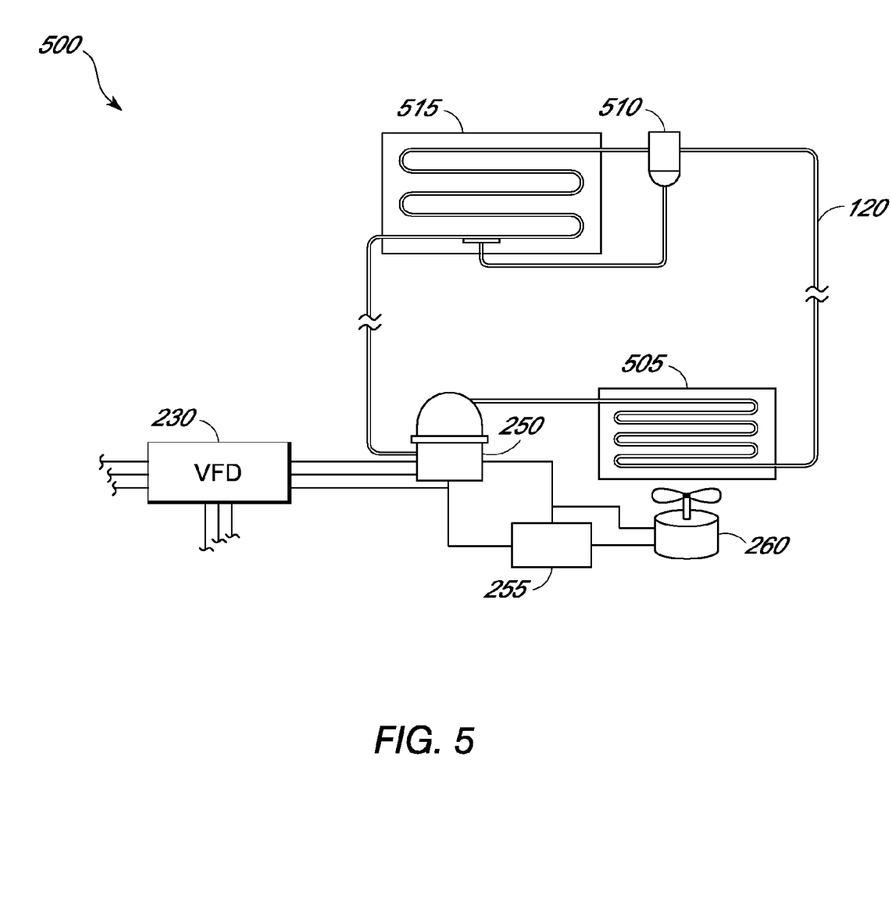
FIG. 5 is a schematic illustration of elements of an HVAC/R system, including a pulsed control valve.

FIG. 5 is a schematic illustration of elements of an HVAC/R system 500, including a pulsed control valve 510. Refrigerant is circulated in the system via the refrigerant lines 120. The compressor motor 250 compresses refrigerant circulated in the refrigerant lines 120 and then passes it to the condenser 505, where the compressed refrigerant is cooled and liquefied. The condenser fan 260 assists with the cooling of the compressed refrigerant by forcing air over cooling fins (not shown) attached to the condenser 505. The compressor motor 250 is electrically connected to a VFD 230, which provides three-phase AC power to it. The VFD 230 is additionally electrically connected to a phase change module 255, which converts the three-phase AC power to single-phase AC power for the condenser fan 260. Collectively, the compressor motor 250, the condenser 505, the condenser fan 260 and the phase change module 255 make up the condenser unit 135 of FIG. 1. After the refrigerant is cooled and condensed in the condenser unit 135, it is passed to the pulsed control valve 310.

The pulsed control valve 510 controls refrigerant flow from the condenser 505 to the evaporator 515. Conventional evaporators are designed to operate at full refrigerant flow and are inefficient at lower flows, and fluctuating flows. However, the VFD powered compressor motor 250 may result in variable refrigerant flows to the condenser and to the evaporator as the drive frequency is modulated according to system cooling needs. In order to achieve optimal system performance, the pulsed control valve 510 is used to produce an optimal refrigerant flow regardless of the action of the VFD 230. Such refrigerant control is especially important at lower refrigerant flow rates resulting from variable compressor speeds. The pulsed control valve 510 may be a mechanical valve such as described in U.S. Pat. Nos. 5,675,982 and 6,843,064 or an electrically operated valve of the type described in U.S. Pat. No. 5,718,125, the descriptions of which are incorporated herein by reference in their entireties.

The evaporator 515 evaporates the compressed refrigerant thereby extracting heat from the air around it. The evaporator 515 may additionally have metal fins (not shown) to increase its heat exchanging efficiency.

Figure 6:
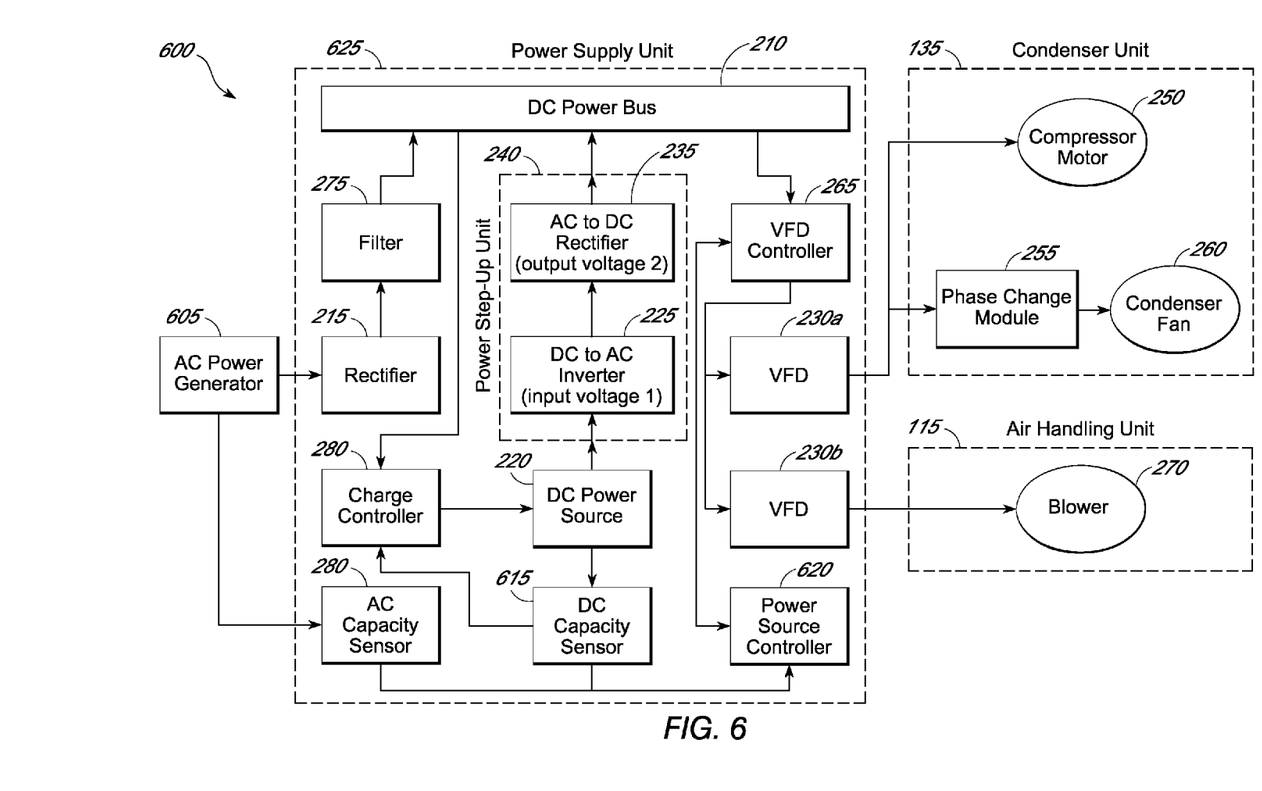
FIG. 6 is a schematic block diagram illustrating an embodiment of an HVAC/R power supply system with a rechargeable DC power back-up, which utilizes an AC generator as an AC power source.

FIG. 6 is a schematic block diagram illustrating an embodiment of an HVAC/R power supply system 600 with a rechargeable DC power back-up, which utilizes an AC generator 605 as an AC power source. FIG. 6 is the system of FIG. 2 augmented with additional sensors 610 and 615 and an additional controller 620. Additionally, the power supply unit 625 of FIG. 6 is provided with AC power by an AC power generator 605, rather than AC grid power.

AC power generator 605 is an electric device that converts mechanical energy to electrical energy. AC power generators are commonly portable devices that have a fuel burning engine used to turn the generator components and create electric energy. Generators may output single phase or multi-phase AC power at a variety of voltages and wattages. For example, a portable diesel generator may have a three-phase, 460 volt AC output with a maximum rated output of 10 kilowatts. Other generators may be capable of outputting single-phase and multi-phase current simultaneously and at different voltages. Other embodiments of AC generators are well known in the art.

AC capacity sensor 610 is electrically connected to the AC power generator 605. The AC capacity sensor may be either the active sensing type, which works by sensing the instant power output of the generator and calculating a capacity remaining of the generator, or of the passive type, whereby the generator sends a signal to the AC capacity sensor corresponding to its remaining power output capacity. Additionally, other sensing methods, as are known in the art, may be used. Useful switching and sensing components and circuits are described in U.S. Pat. No. 7,227,749, incorporated herein by reference. The AC capacity sensor 610 is also electrically connected to a power source controller 620, which is described in more detail below.

DC capacity sensor 615 is electrically connected to the DC power source 220. The DC capacity sensor may be either the active sensing type, which works by sensing the instant capacity of the DC power source, or of the passive type, whereby the DC power source 220 sends a signal to the DC capacity sensor 615 corresponding to its remaining power output capacity. With DC power sources, such as batteries, the capacity of the power source is generally based on the instant voltage of the power source. For example, as the measured voltage across the battery's terminals decreases, so too does the calculated DC power source capacity. However, other sensing methods, as are known in the art, may be used. Additionally, the DC capacity sensor 615 is electrically connected to the power source controller 620, which is described in more detail below.

The power source controller 620 is electrically connected to one or more power capacity sensors, such as AC capacity sensor 610 and DC capacity sensor 615. In this embodiment, the power source controller 620 is also electrically connected to the VFD controller 265. The power source controller 620 receives power output capacity data from the sensors connected to it, as well as power load data from the VFD controller and calculates a power source distribution. In simple embodiments, the power source controller 620 might instruct the VFD controller 265 to choose either the AC power generator 605 as a power source or the DC power source 220 as a power source for operation of the HVAC/R components. In a preferred embodiment, the power source controller 620 senses the load required from the VFD controller and instructs the VFD controller to selectively draw supplemental power from the DC power source, while relying primarily on the AC power generator 605, so as to not overload the AC power generator 605. For example, during periods of start-up of the HVAC/R components, power needs may temporarily exceed the total power output of the AC power generator 605, or the instant power capacity of the AC power generator 605. In such a case, the power source controller 620 would direct the VFD controller 265 to utilize stored capacity in the DC power source 220 to avoid generator overload and potential HVAC/R component damage. Likewise, the power source controller 620 may instruct the VFD controller 265 to reduce its power draw given the combined capacity of the DC power source 220 and AC power generator 605. In preferred embodiments, the power source controller 620 can cause the VFD controller to draw power in any increment (e.g. 0%-100%) from any available power source, such as the AC power generator 605 and the DC power source 220. Notably, in other embodiments, there may be additional power sources, such as AC grid power in addition to AC power generator 605. Likewise, there could be multiple, independent DC power sources to draw from independently according to the programming of the power source controller 620.

In other embodiments, the power source controller 620 may be incorporated into the VFD controller 265. In such embodiments, the VFD controller is capable of receiving data from the AC capacity sensor 610 and the DC capacity sensor 615 so that it may regulate the power drawn from each source in accordance with the load required by the HVAC/R system.

The power source controller 620 may comprise a microprocessor or computing system including software and hardware configured to accomplish the aforesaid operations. Examples of controller features and functions are described in U.S. Pat. No. 7,630,856, the relevant portions of which are incorporated herein by reference.

Figure 7:
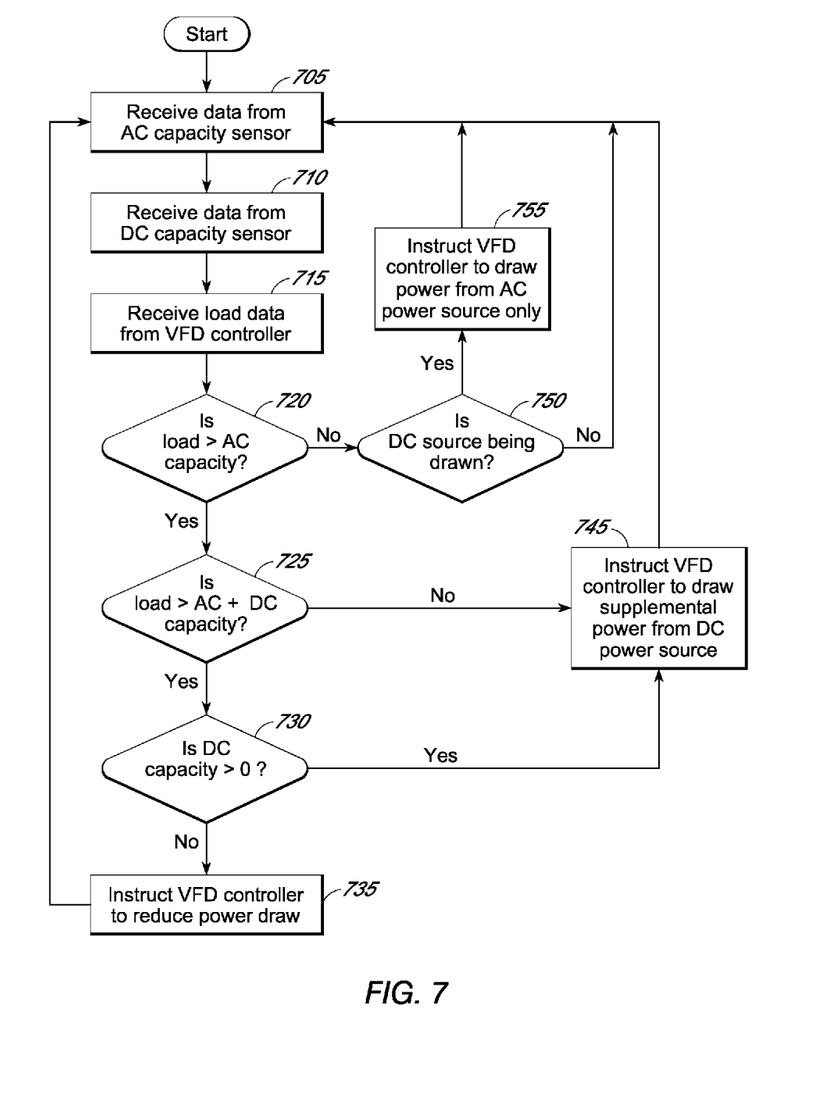
FIG. 7 is a flowchart showing exemplary logic for a controller, such as power source controller.

FIG. 7 is a flowchart showing exemplary logic for a controller, such as power source controller 620 in FIG. 6. In the embodiment of FIG. 7, the power source controller is AC biased; that is, the controller will prefer to always draw from an AC power source, such as the AC power generator 605 of FIG. 6, rather than a DC power source, such as DC power source 220 in FIG. 6, where adequate AC power is available. This strategy is not required, but may be preferable where it is desirable to keep the DC power source at max capacity as often as possible. Further, it may be desirable to reduce the cycling (i.e. charge-discharge-charge) of the DC power source to extend the lifetime of the DC power source. Accordingly, at state 705 the power source controller 620 receives capacity data from an AC capacity sensor, such as sensor 610 in FIG. 6. Next, at state 710 the power source controller 620 receives capacity data from a DC capacity sensor, such as sensor 615 in FIG. 6. Then at state 715, the power source controller receives load data from the VFD controller, such as controller 265 in FIG. 6. The power source controller 620 then compares the current load to the available AC capacity at decision 720. If the load is less than the AC capacity, then at decision state 750 the power source controller 620 determines whether the DC power source is being drawn from. If the DC power source is being drawn from, the power source controller 620 instructs the VFD to draw power from the AC power source only at state 755, since there is ample AC capacity. If, on the other hand, no power is being drawn from the DC source, then the power source controller loops back into a data gathering step at state 705. If, at decision state 720, the load is greater than the AC capacity alone can provide, the power source controller then determines whether the load is greater than the combined capacity of the AC and DC power sources at decision state 725. If the combined power capacities of the AC and DC power sources are adequate to cover the load, the power source controller instructs the VFD controller to draw the excess power from the DC power source at state 745. If, on the other hand, the load is greater than the combined power capacities of the AC and DC power sources, then the power source controller 620 determines if there is remaining DC capacity at decision state 730. If there is remaining DC capacity at decision state 730, the power source controller 620 instructs the VFD controller to draw the remaining DC power capacity from the DC power source at state 745. Then the power source controller loops back into a data gathering step at state 705. If there is no remaining DC power capacity at decision state 730, the power source controller instructs the VFD controller to reduce power draw at state 735. For example, at state 735, the power source controller could instruct the VFD power controller to lower the speed of all motors attached to the VFDs to reduce overall power draw. Then the power source controller loops back into a data gathering step at state 705. FIG. 7 is merely one exemplary embodiment of programming logic that may be used with the power source controller 620.

While the above detailed description has shown, described, and pointed out novel features as applied to various embodiments, it will be understood that various omissions, substitutions, and changes in the form and details of the devices and processes illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. A heating, ventilation, air conditioning, and refrigeration (HVAC/R) system, comprising:
    an alternating current (AC) power source;
    an HVAC/R system comprising one or more three-phase motors and one or more single-phase motors;
    a direct current (DC) power source comprising a rechargeable battery assembly configured to provide power to the HVAC/R system when sufficient alternating current is not available from the AC power source; and a variable frequency drive (VFD) configured to provide three-phase power to the one or more three-phase motors; and a phase change module configured to receive three-phase power from the VFD and provide single-phase power to the one or more single-phase motors.

2. The HVAC/R system of claim 1, wherein each of the one or more three-phase motors drives a compressor.

3. The HVAC/R system of claim 2, further comprising an electronic controller linked to the VFD and configured to control the output of the VFD.

4. The HVAC/R system of claim 2, further comprising at least one condenser, at least one evaporator, and piping for directing refrigerant from the compressor to the at least one condenser and from the at least one condenser to the at least one evaporator, and a pulsed operation refrigerant flow control valve connected to the piping for controlling refrigerant flow to the at least one evaporator.

5. The HVAC/R system of claim 4, wherein the pulsed operation refrigerant flow control valve is a mechanical valve.

6. The HVAC/R system of claim 4, wherein the pulsed operation refrigerant flow control valve is an electronic valve.

7. The HVAC/R system of claim 1, wherein the single-phase motor drives a condenser fan.

8. The HVAC/R system of claim 1, the phase change module comprising a plurality of capacitors in series and at least one capacitor in parallel with the plurality of capacitors in series.

9. The HVAC/R system of claim 1, wherein the phase change module comprises a plurality of capacitors in series.

10. The HVAC/R system of claim 1, further comprising an AC power generator for supplying AC power, a first sensor for monitoring the capacity of the AC power generator, a second sensor for monitoring the capacity of the DC power source and a controller communicating with the first and second sensors and the VFD power supply, and configured to regulate the power supplied to the VFD in response to the sensed capacity of the AC power generator and the DC power source at a level to avoid system overload.

11. A heating, ventilation, air conditioning, and refrigeration (HVAC/R) system, comprising:
   an air conditioning system comprising a condenser, a variable speed condenser motor and one or more evaporators;
   an alternating current (AC) power source;
   a direct current (DC) power source comprising a rechargeable battery assembly configured to provide power to the air conditioning system when sufficient alternating current is not available from the AC power source;
   a variable frequency drive (VFD) configured to provide three-phase power to the variable speed condenser motor and single-phase power to a single-phase motor; and a pulsed operation refrigerant flow control valve configured to control refrigerant flow to the one or more evaporators.

12. The HVAC/R system of claim 11, wherein the pulsed operation refrigerant flow control valve is a mechanical valve.

13. The HVAC/R system of claim 11, wherein the pulsed operation refrigerant flow control valve is an electronic valve.

14. The HVAC/R system of claim 11, wherein the single-phase motor is a condenser fan motor.

15. The HVAC/R system of claim 11, further comprising an electronic controller electrically connected to the VFD for controlling the VFD output.

16. The HVAC/R system of claim 15, wherein the electronic controller is also linked to the pulsed operation refrigerant flow control valve for controlling the refrigerant flow.

17. The HVAC/R system of claim 11, further comprising an AC power generator for supplying AC power, a first sensor for monitoring the capacity of the AC power generator, a second sensor for monitoring the capacity of the DC power source and a controller communicating with the first and second sensors and the VFD power supply, and configured to regulate the power supplied to the VFD in response to the sensed capacity of the AC power generator and the DC power source at a level to avoid system overload.

18. A heating, ventilation, air conditioning, and refrigeration (HVAC/R) system, comprising:
   one or more three-phase motors;
   one or more single-phase motors;
   an alternating current (AC) power generator;
   a direct current (DC) power source comprising a rechargeable battery assembly configured to provide power to the HVAC/R system when sufficient alternating current is not available; and
   a variable frequency drive (VFD) power supply electrically connected to the DC power source and configured to provide three-phase power to the three-phase motor and single-phase power to single-phase motor.

19. The HVAC/R system of claim 18, further comprising a sensor for monitoring the available capacity of the AC power generator.

20. The HVAC/R system of claim 19, further comprising a sensor for monitoring the available DC power source capacity, and wherein the controller is configured to switch between AC and DC power supplied to the VFD in response to sensed AC power generator and DC power source capacities.

21. An HVAC/R power supply system, comprising:
   an alternating current (AC) power source connected to a rectifier to provide direct current (DC) power to a DC power bus;
   a direct current DC power source connected to the DC power bus, wherein the DC power source comprises at least one rechargeable battery;
   a Variable Frequency Drive (VFD) configured to receive DC power and outputs three-phase AC power to at least one AC motor in the HVAC/R system and output single-phase power to a single-phase motor; and
   a VFD controller electrically connected to the VFD and configured to control the output frequency of the VFD in order to control the speed of the AC motor.

22. The HVAC/R power supply system of claim 21, wherein the AC power source is AC grid power.

23. The HVAC/R power supply system of claim 21, wherein the AC power source is an AC generator.

24. The HVAC/R power supply system of claim 21, wherein the VFD controller is a microprocessor.

25. The HVAC/R power supply system of claim 21, further comprising a power source controller electrically connected to the VFD controller, and configured to regulate the power consumption of the VFD controller with respect to the AC power source and the DC power source.

26. The HVAC/R power supply system of claim 25, further comprising an AC capacity sensor configured to sense the AC power source capacity, and a DC capacity sensor configured to sense the DC power source capacity.

27. The HVAC/R power supply system of claim 21, further comprising:
   a charge controller electrically connected to the DC power source, and configured to regulate the charge current to the DC power source.

28. The HVAC/R power supply system of claim 21, further comprising:
   a filter electrically connected to the rectifier, and configured to filter the rectified DC power output from the rectifier.

29. The HVAC/R power supply system of claim 21 further comprising a power step-up unit configured to receive an input voltage from the DC power source and output an output voltage to the DC power bus, wherein the output voltage is greater than the input voltage.

* * * * *